United States Patent [19]
Melville

[11] Patent Number: 5,913,591
[45] Date of Patent: Jun. 22, 1999

[54] AUGMENTED IMAGING USING A SILHOUETTE TO IMPROVE CONTRAST

[75] Inventor: Charles D. Melville, Issaquah, Wash.

[73] Assignee: University of Washington, Seattle, Wash.

[21] Appl. No.: 09/009,759

[22] Filed: Jan. 20, 1998

[51] Int. Cl.[6] .......................... G03B 21/14; G02B 27/10
[52] U.S. Cl. ...................... 353/28; 353/97; 359/630; 345/9
[58] Field of Search ................... 353/10, 28, 62, 353/97; 359/630, 629; 349/11; 345/7, 8, 9

[56] References Cited

U.S. PATENT DOCUMENTS

| | | |
|---|---|---|
| 4,859,846 | 8/1989 | Burrer . |
| 4,942,766 | 7/1990 | Greenwood et al. . |
| 5,121,138 | 6/1992 | Schermer et al. . |
| 5,164,848 | 11/1992 | Firth et al. ............................... 359/630 |
| 5,280,163 | 1/1994 | Barkan ..................................... 359/199 |
| 5,280,377 | 1/1994 | Chandler et al. ........................ 359/196 |
| 5,467,104 | 11/1995 | Furness, III et al. ........................ 345/8 |
| 5,526,184 | 6/1996 | Tokuhashi et al. ...................... 359/630 |
| 5,546,099 | 8/1996 | Quint et al. . |
| 5,557,444 | 9/1996 | Melville et al. .......................... 359/199 |
| 5,587,836 | 12/1996 | Takahashi et al. ....................... 359/630 |
| 5,596,339 | 1/1997 | Furness, III et al. ........................ 345/8 |
| 5,625,493 | 4/1997 | Matsumura et al. .................... 359/630 |
| 5,671,076 | 9/1997 | Matsubara et al. ...................... 359/196 |
| 5,694,237 | 12/1997 | Melville .................................. 359/214 |
| 5,712,649 | 1/1998 | Tosaki ..................................... 359/630 |
| 5,726,806 | 3/1998 | Holden et al. ........................... 359/630 |
| 5,782,547 | 7/1998 | Machtig et al. ........................... 353/28 |

*Primary Examiner*—William Dowling
*Attorney, Agent, or Firm*—Steven P. Koda

[57] ABSTRACT

An augmented display includes an image display source and a silhouette display source. The image display source generates a virtual image to be perceived by a viewer. The silhouette display source occurs in the path of the background light. The silhouette display source generates a mask corresponding to the image content of the image display. The mask is a darkened area reducing or blocking background light. As the light from the virtual image is overlaid onto the background, there is less background light in the portion where the image appears.

29 Claims, 4 Drawing Sheets

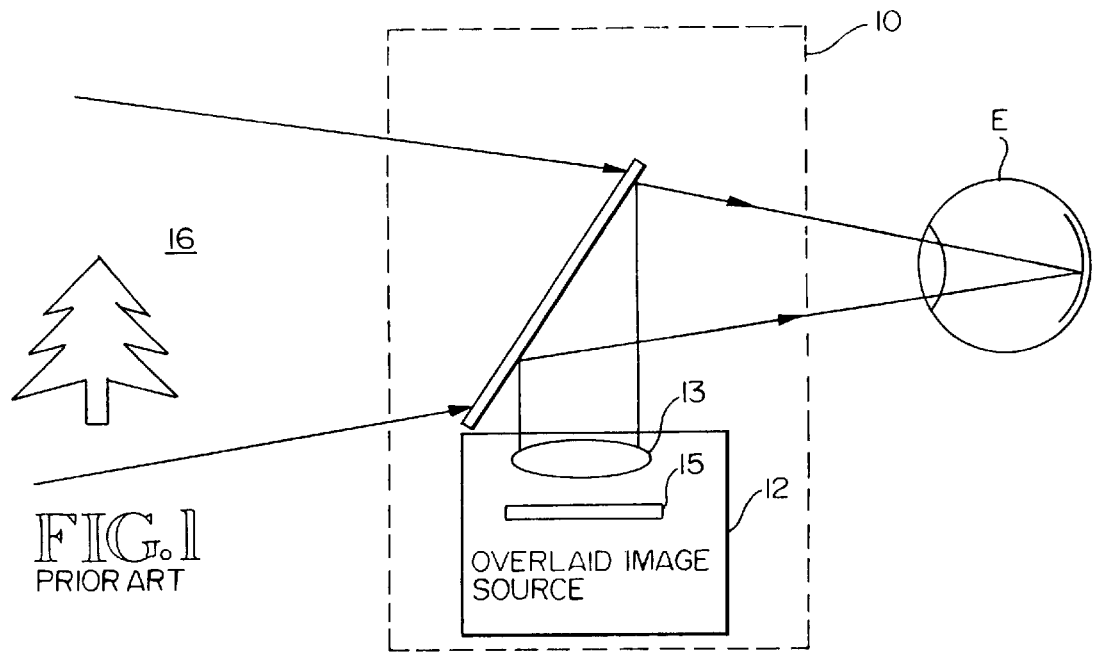
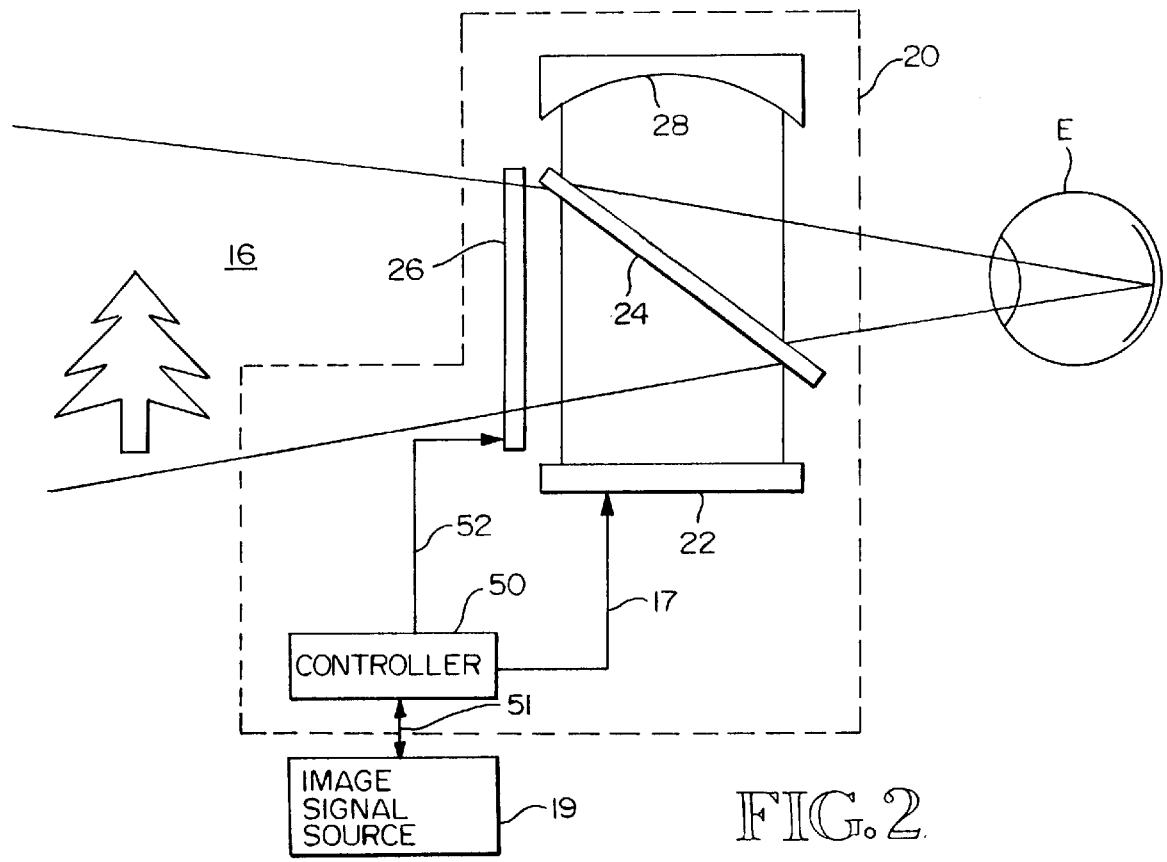

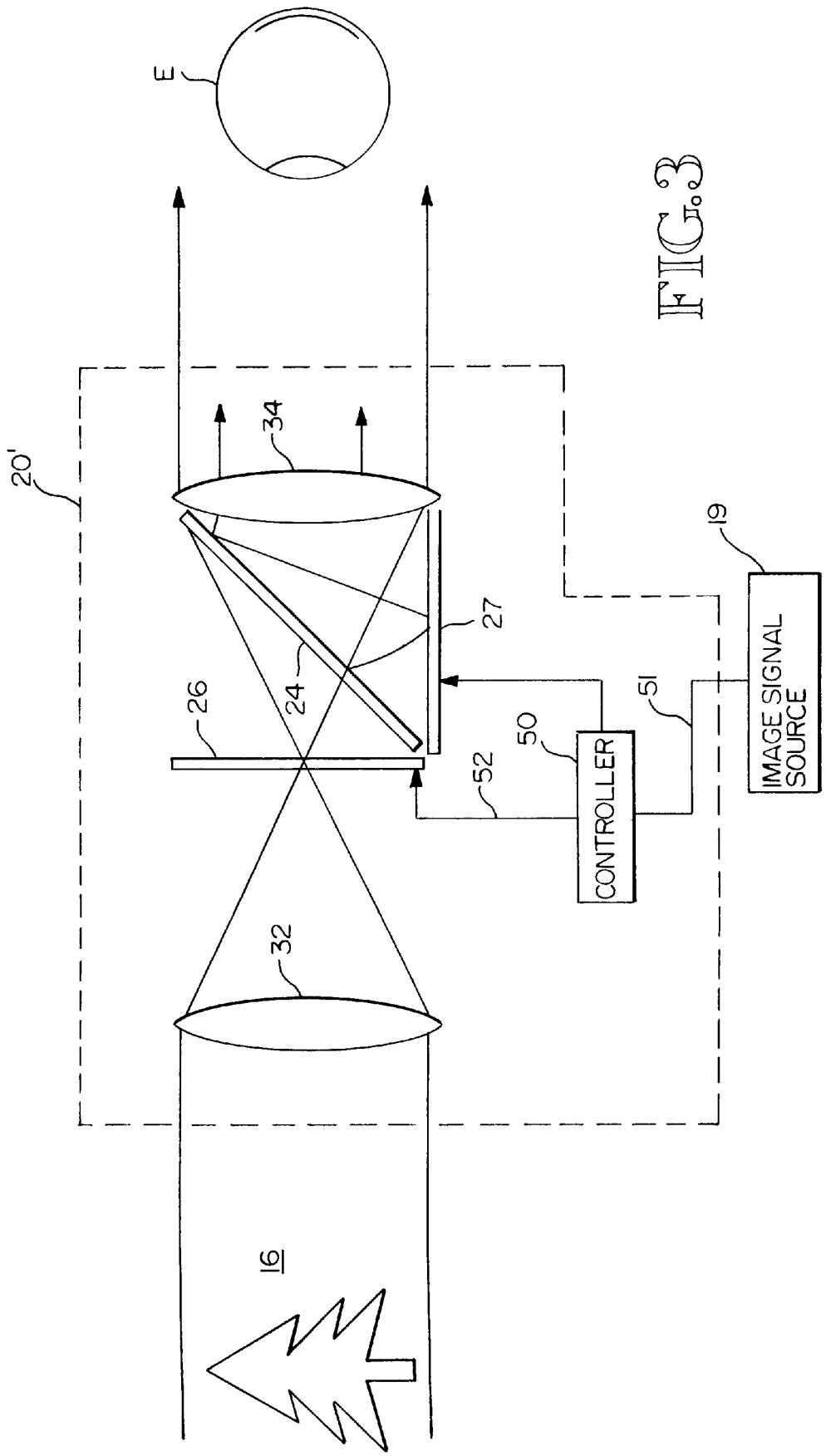

AUGMENTED IMAGING USING A SILHOUETTE TO IMPROVE CONTRAST

BACKGROUND OF THE INVENTION

This invention relates to augmented imaging techniques and augmented displays.

An augmented display is a see-through display which overlays an image onto a background. The overlaid image is a virtual image. The background is a real world view of the ambient environment. The overall image is formed by adding light to the background. The added light corresponds to the virtual image. The virtual image appears to be transparent because in the display portion where the image is formed, light from both the virtual image and the background impinge on the same photoreceptors in the viewer's eye. Because light from both light sources impinge on the same photoreceptors, it may be difficult for the viewer to distinguish between the image and the background. This invention is directed toward a method and apparatus for improving the contrast of an augmented display.

SUMMARY OF THE INVENTION

According to the invention, an augmented display includes an image display source and a silhouette display source. The image display source generates a luminous virtual image to be perceived by a viewer. The silhouette display source occurs in the path of the background light.

According to one aspect of this invention, the silhouette display source generates a mask corresponding to the image content of the image display. The mask is a darkened area reducing or blocking background light. As the light from the virtual image is overlaid onto the background, there is less background light in the portion where the image appears. In one embodiment the mask shape and size is the same as the virtual image content created by the image display. In effect, the mask is a dark version of the virtual image content. In another embodiment the mask encompasses more area than just the image area of the virtual image.

An advantage of using a silhouette mask is that the content of the virtual image appears to be solid, rather than transparent. The virtual image overlays and eclipses the background objects.

According to another aspect of the invention, in a telescope embodiment the silhouette display source is located at the intermediate image plane of the telescope. An advantage of locating the silhouette display source at the intermediate image plane is that the darkened silhouette is in focus. There is a sharp edge between the background and the silhouette mask. Another advantage is that the virtual image appears more real when the mask is in focus.

These and other aspects and advantages of the invention will be better understood by reference to the following detailed description taken in conjunction with the accompanying drawings.

BRIEF DESCRIPTION OF THE DRAWINGS

FIG. 1 is a block diagram of a conventional augmented display;

FIG. 2 is an optical schematic of an augmented display according to one embodiment of this invention;

FIG. 3 is an optical schematic of an augmented display according to another embodiment of this invention;

DESCRIPTION OF SPECIFIC EMBODIMENTS

Overview

Figure 4:
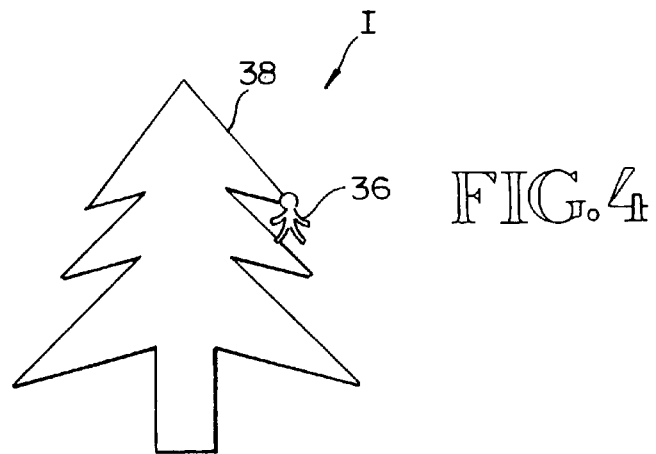
FIG. 4 is a diagram of an image generated by the display of FIG. 1.

FIG. 1 shows a block diagram of a conventional augmented display apparatus 10. The display apparatus 10 includes a generated image source 12 and a beamsplitter 14. The image source 12 includes a lens 13 and an image plane generator 15. Light is received at the beamsplitter 14 from the image source 12 and from the outside ambient environment 16. The light from each passes through the beamsplitter and reaches a viewer's eye E. In effect the image generated by the image source 12 is overlaid onto the background view of the ambient environment.

FIG. 2 shows an optical schematic diagram of an augmented display 20 according to an embodiment of this invention. The display 20 includes a virtual image display 22, a silhouette display 26, a controller 50, a beamsplitter 24 and a mirror 28. The display 20 receives an image signal 51, such as an RGB signal, NTSC signal, VGA signal or other formatted color or monochrome video or image data signal, from an image signal source 19. A virtual image signal 17 and a silhouette image signal 52 are derived from the image signal 51 at the controller 50. The virtual image signal 17 is input to the virtual image display 22 which in response generates light for forming a virtual image. The silhouette image signal 52 is input to a silhouette display 26 which in response generates a silhouette image. The virtual image display 22 is a flat panel display, CRT monitor, or virtual retinal display. Light defining a virtual image is emitted from the virtual image display 22 and passes through the beamsplitter 24 before impinging on the viewer's eye E. The silhouette display 26 is a liquid crystal display panel or another transparent display device which passes background light from the ambient environment. Background light 16 passes through the silhouette display 26 and beamsplitter 24, then impinges on the viewer's eye E. The concave mirror 28 receives some of the virtual image light from the beamsplitter. The mirror 28 reflects such light back into the beamsplitter and on to the viewer's eye E to increase the amount of light reaching the eye E. The mirror acts like a lens to locate the virtual image at the same apparent distance as the real image.

FIG. 3 shows an alternative embodiment of an augmented display 20'. Components serving a similar function as in display 20 are given the same part numbers. The display 20' includes a virtual image source 22, such as a flat panel display, CRT monitor, or virtual retinal display. In addition, the display 20' includes a beamsplitter 24, a silhouette display 26, an objective lens 32, an eyepiece 34 and a controller 50. Background light passes through the objective lens 32 and is focused to an intermediate image plane which is concurrent with the silhouette display 26. The silhouette display 26 is normally transparent and passes the focused background light. The background light passes through the silhouette display 26, beamsplitter 24, and an eyepiece 34, then impinges on the viewer's eye E. Light defining a virtual image is emitted from the virtual image source 22 and passed through the beamsplitter 24 and eyepiece 34 before impinging on the viewer's eye E.

Operation

Figure 5:
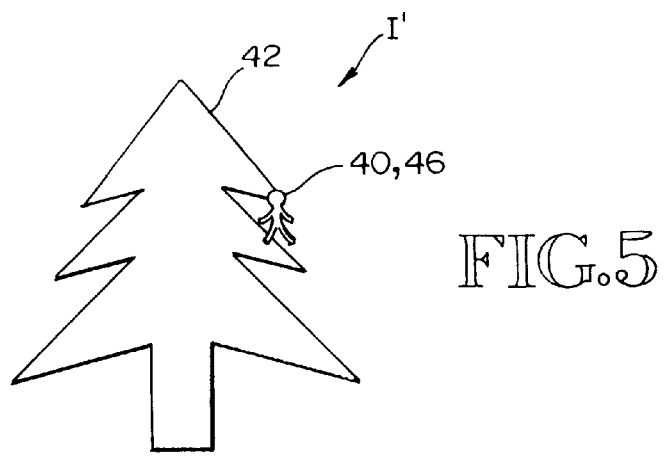
FIG. 5 is a diagram of an image generated by the display of FIGS. 2 or 3 according to an embodiment of this invention.

FIG. 4 shows an image I perceived by a viewer for the conventional display 10 of FIG. 1. An image 36 is overlaid onto a background image 38. Note that the overlaid image 36 is transparent. FIG. 5 shows an image I' perceived by a viewer for the displays 20 or 20' of FIGS. 2 and 3 according to this invention. Although the same image I' is depicted for each display 20, 20', in practice the image from display 20 will have a fuzzy, out of focus dark area around the overlaid image I'. The image I' from display 20' will have a sharper, in focus border at the overlaid image I'.

Figure 6:
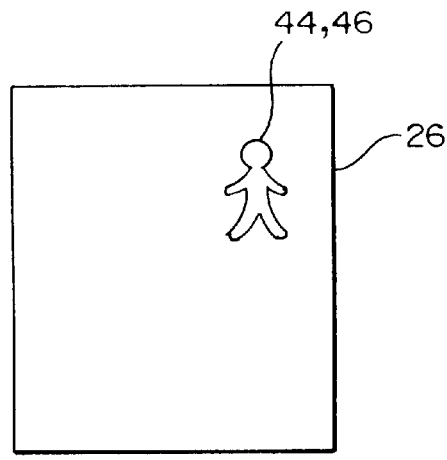
FIG. 6 is a diagram of the silhouette display 26 of FIGS. 2 or 3 with a masked region shown according to an embodiment of this invention.

A virtual image 40 is generated by the virtual image display 22. Concurrently a background image 42 formed by background light from the ambient environment is passed through the silhouette display 26. In effect the virtual image 40 is overlaid onto the background image 42. According to one aspect of this invention, the silhouette display 26 is darkened within a select region 44 (see FIG. 6) to reduce or preclude background light from passing through such select region 44. Such select region 44 corresponds to the virtual image 40 and serves as a mask 46. In one embodiment the mask 46 coincides with the virtual image 40 (see FIG. 5). In another embodiment the mask 46 encompasses more area than just the virtual image 40 (see FIGS. 7 and 8).

To define the virtual image 40, the virtual image display 22 receives image data signals 51 from a computer or other signal source 19. In one embodiment a controller 50 for the silhouette display 26 also receives such image data signals 51. In response the controller 50 generates a masking signal 52 which darkens a select region 44 of the silhouette display 26 to define the corresponding mask 46. In one embodiment a pixel to pixel mask 46 (see FIG. 6) is generated, in which for each pixel of the virtual image 40 there is a corresponding pixel darkened in the silhouette display 26. In another embodiment, in addition to pixel to pixel masking, additional pixels on the silhouette display 26 are darkened to mask other portions within or around the virtual image 40 (see FIG. 8).

Figure 7:
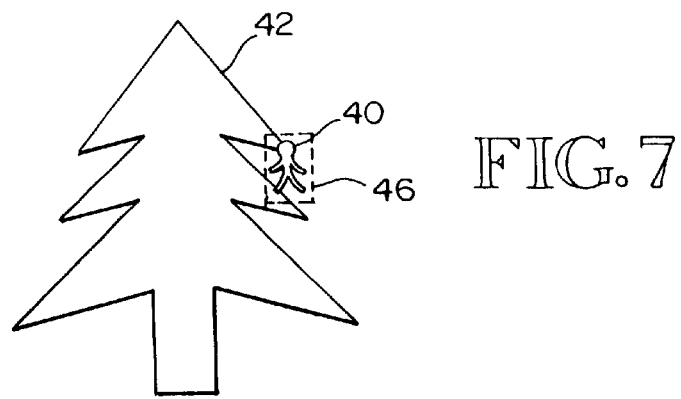
FIG. 7 is a diagram of an image generated by the display of FIGS. 2 or 3 according to an embodiment of this invention.
Figure 8:
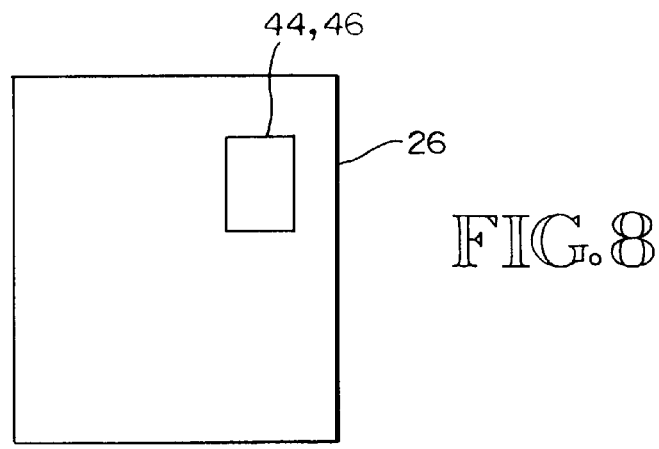
FIG. 8 is a diagram of the silhouette display 26 of FIGS. 2 or 3 with an alternative masked region shown according to an embodiment of this invention.

Although the images shown in FIGS. 5 and 7 include only one virtual image 40 and one mask 46, in alternative embodiments there are multiple images 40 and masks 46 viewable at a given time. Similarly, although only one mask is shown in each of FIGS. 6 and 8, in alternative embodiments multiple darkened regions 44 and masks 46 are formed.

In one embodiment the silhouette display 26 has the same pixel resolution as the virtual image source display 22. In another embodiment the silhouette display 26 has a differing resolution (e.g., lower or higher resolution) than the virtual image display 22. For varying resolution, the mapping of the virtual image 40 to the mask 46 differs than one pixel to one pixel. For every pixel of the virtual image display 22, there is at least one pixel of the silhouette display 26 which is darkened. However, the pixel darkened for the silhouette display 26 may encompass one or more pixels of the image display 22 (e.g., where silhouette display 26 has lower resolution than the virtual image display 22). According to one embodiment the silhouette display 26 is formed by a transparent liquid crystal display ('LCD') panel. The LCD panel is addressable to pixel precision. When a pixel is unactivated the region of the pixel on the panel darkens reducing or precluding background light from passing.

Although the controller 50 is shown to receive the image data signal 51, in an alternative embodiment the processor generating the image data signal 51 for the display 22 also serves as the controller for generating the masking signal 52.

Virtual Retinal Display

Figure 9:
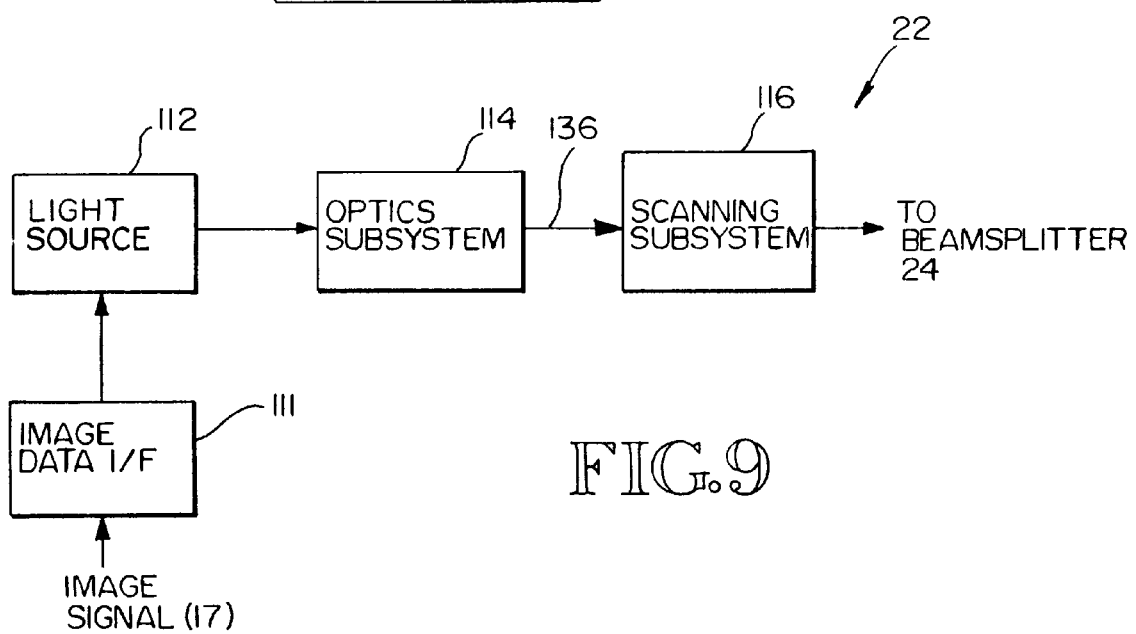
FIG. 9 is an optical schematic of a virtual retinal display embodiment of the virtual image source of FIGS. 2 and 3.

FIG. 9 is a block diagram of a virtual retinal display 22 which generates and manipulates light to create color or monochrome images having narrow to panoramic fields of view and low to high resolutions. The display 22 includes an image data interface 111 which receives a virtual image signal 17 from the controller 50 (see FIGS. 2 or 3). The image data interface 111 generates signals for controlling a light source 112. Light modulated with video information corresponds to image elements (e.g., image pixels) which are scanned onto the retina of a viewer's eye E to produce the perception of an erect virtual image.

The virtual image signal 17 is a video or other image signal, such as an RGB signal, NTSC signal, VGA signal or other formatted color or monochrome video or graphics signal. An exemplary embodiment of the image data interface 111 extracts color component signals and synchronization 'SYNCH' signals from the received image signal. In an embodiment in which an image signal has embedded red, green and blue components, the red signal is extracted and routed to a modulator for modulating a red light point source output. Similarly, the green signal is extracted and routed to a modulator for modulating the green light point source output. Also, the blue signal is extracted and routed to a modulator for modulating the blue light point source output.

The light source 112 includes one or more point sources of light. For generating a monochrome image a single monochrome emitter typically is used. For color imaging, multiple light emitters (e.g., red light point source, green light point source, and blue light point source) are used. Preferably the emitted light is spatially coherent. Exemplary light emitters include colored lasers, laser diodes or light emitting diodes (LEDs). Although LEDs typically do not output coherent light, lenses are used in one embodiment to shrink the apparent size of the LED light source and achieve flatter wave fronts. In a preferred LED embodiment a single mode monofilament optical fiber receives the LED output to define a point source which outputs light approximating coherent light.

Where the light emitters are externally modulated, the display device 22 also includes a modulator responsive to an image data signal received from the image data interface 111. The modulator modulates the visible light emitted by the light emitters to define image content for the virtual imagery scanned on a viewer's eye. The modulator is an acoustooptic, electrooptic, or micro-electromechanical modulator. Additional detail on these and other light source 112 embodiments are found in U.S. patent application Ser. No., 08/437,818 for "Virtual Retinal Display with Fiber Optic Point Source" filed May 9, 1995, and incorporated herein by reference. According to alternative embodiments, the light emitters or the light generated by the point sources are modulated to include red, green, and/or blue components at a given point (e.g., pixel) of a resulting image. Respective beams of the point sources are modulated to introduce color components at a given pixel.

The optics subsystem 114 receives the light output from the light source 112, either directly or after passing through the scanning subsystem 116. In some embodiments the optical subsystem collimates the light. In another embodiment the optics subsystem converges the light. Left undisturbed the light converges to a focal point then diverges beyond such point. As the converging light is deflected, however, the focal point is deflected. The pattern of deflection defines a pattern of focal points. Such pattern is referred to as an intermediate image plane.

The emitted light 136 is deflected along a prescribed pattern, such as a raster pattern by a scanner subsystem 116. In an alternative embodiment another display format such as vector imaging can be used for scanning image elements onto the eye. In one embodiment the scanning subsystem 116 receives a horizontal deflection signal and a vertical deflection signal derived from the image data interface 111. The scanning subsystem 116 is located after the light source 112, either before or after the optics subsystem 114. In one embodiment the scanning subsystem 116 includes a resonant scanner for performing horizontal beam deflection and a galvanometer for performing vertical beam deflection. The horizontal scanner receives a drive signal having a frequency defined by the horizontal synchronization signal extracted at the image data interface 111. Similarly, the galvanometer serving as the vertical scanner receives a drive signal having a frequency defined by the vertical synchronization signal VSYNC extracted at the image data interface 111. Preferably, the horizontal scanner has a resonant frequency corresponding to the horizontal scanning frequency. In alternative embodiments, the scanning subsystem 116 instead includes acousto-optical deflectors, electro-optical deflectors, rotating polygons or galvanometers to perform the horizontal or vertical light deflection. In some embodiments, two of the same type of scanning device are used. In other embodiments different types of scanning devices are used for the horizontal scanner and the vertical scanner.

The light emitted from the display 22 is deflected by the beamsplitter 24 (see FIGS. 2 and 3) and directed toward a viewer's eye E. In the embodiment of FIG. 3 an eyepiece 34 also is included.

Meritorious and Advantageous Effects

An advantage of using a silhouette mask is that the content of the virtual image appears to be solid, rather than transparent. The virtual image overlays and eclipses the background objects. An advantage of locating the silhouette display source at the image plane is that the darkened silhouette is in focus. There is a sharp edge between the background and the silhouette mask. Another advantage is that the virtual image appears more real when the mask is in focus.

Although preferred embodiments of the invention have been illustrated and described, various alternatives, modifications and equivalents may be used. Therefore, the foregoing description should not be taken as limiting the scope of the inventions which are defined by the appended claims.

What is claimed is:

1. A display apparatus in which a viewer perceives a virtual image overlaid onto ambient environment background light, comprising:

a virtual image display for generating a virtual image;

a silhouette display in a path of the background light, the silhouette display having a transparent display region;

a controller for controlling an amount of background light passing through a portion of the silhouette display's transparent display region;

wherein a viewer receives from the virtual image display light which defines the virtual image and receives background light through the silhouette display with background light reduced in portions of the silhouette display, wherein the reduced background light portion of the silhouette display forms a mask for the virtual image.

2. The display apparatus of claim 1, wherein the virtual image display is a virtual retinal display.

3. The display apparatus of claim 1, wherein the virtual image display is a flat panel display.

4. The display apparatus of claim 1, further comprising an objective lens for the background light, and wherein the silhouette display is positioned at an intermediate image plane of the background light which causes the mask to be in focus.

5. The display apparatus of claim 1, wherein no background light passes through the reduced background light portion of the silhouette display to form a darkened mask.

6. The display apparatus of claim 1, wherein the silhouette display is controlled in pixel units, and wherein the controller selectively controls the amount of background light passing through any given pixel.

7. An augmented display, comprising:

an image source having an image output and being operative to emit light forming a visible image;

a beam combiner having a first input, a second input, and a combiner output, the beam combiner being positioned to receive light emitted by the image source at the first input and to receive light from a background at the second input, the beam combiner being operative to produce a combined image including light received at the first input and the second input and to output the combined image at the combiner output; and a silhouette interposed between the second input and the background, the silhouette including a first region operative to transmit light from the background to the second input with a first attenuation and a second region operative to transmit light from the background to the second input with a second attenuation different than the first attenuation.

8. The display of claim 7, wherein the silhouette is an electronically controlled silhouette.

9. The display of claim 8, further comprising:

an image signal source coupled to the image source and operative to provide an image signal representing the visible image; and an electronic controller having an input coupled to the image signal source and an output coupled to the silhouette.

10. The display of claim 9, wherein the silhouette includes a liquid crystal panel.

11. The display of claim 9, wherein the electronic controller includes image tracking circuitry operative to extract from the image signal a location of a selected portion of the image and to produce a silhouette signal indicative of the location of the selected portion, and wherein the silhouette is responsive to the silhouette signal to position the second region overlaying a part of the selected portion.

12. The display of claim 11, wherein the second region is shaped to conform to the selected image portion.

13. The display of claim 12, wherein the second region is larger than the selected image portion.

14. The display of claim 7, wherein the second attenuation is larger than the first attenuation.

15. The display of claim 7, wherein the beam combiner includes a beamsplitter.

16. A virtual retinal display apparatus, comprising:

a display output configured for coupling to a viewer's eye;

a first light emitter having a first signal input terminal and being responsive to emit light in a pattern defined by an image signal received at the first signal input terminal;

a silhouette positioned to receive light from a background, the silhouette having a plurality of regions of variable transmissivity; and a beam combiner having a first input positioned to receive the emitted light and a second input positioned to receive light from the plurality of regions of variable transmissivity, the beam combiner being operative to produce a combined image responsive to light received at the first and second inputs.

17. The display apparatus of claim 16, wherein the first light emitter includes a light source and a scanner.

18. The display apparatus of claim 17, wherein the silhouette is an electronically controlled silhouette.

19. The display apparatus of claim 18, further comprising:

an image signal source coupled to the image source and operative to provide an image signal representing the visible image; and an electronic controller having an input coupled to the image signal source and an output coupled to the silhouette.

20. The display apparatus of claim 19, wherein the silhouette includes a liquid crystal panel.

21. The display apparatus of claim 19, wherein the electronic controller includes image tracking circuitry operative to extract from the image signal a location of a selected portion of the image and to produce a silhouette signal indicative of the location of the selected portion, and wherein the silhouette is responsive to the silhouette signal to position the second region overlaying a part of the selected portion.

22. The display apparatus of claim 21, wherein the second region is shaped to conform to the selected image portion.

23. The display apparatus of claim 22, wherein the second region is larger than the selected image portion.

24. The display apparatus of claim 17, wherein the second attenuation is larger than the first attenuation.

25. The display apparatus of claim 17, wherein the beam combiner includes a beamsplitter.

26. A method for forming an augmented image having an overlaid virtual image in contrast with background light, the method comprising the steps of:

generating light defining a virtual image to be perceived by a viewer;

passing background light through a silhouette display, wherein background light is light from an ambient environment viewed by a viewer;

overlaying the virtual image light and the background light;

generating a mask for the virtual image by reducing the amount of background light passing through a portion of the silhouette display.

27. The method of claim 26, in which the silhouette display is positioned at an intermediate image plane of the background light enabling the mask to be in focus to the viewer.

28. The method of claim 26, wherein no background light passes through the silhouette display at the portion of the silhouette display generating the mask.

29. The method of claim 26, wherein the silhouette display is controlled in pixel units, and wherein the step of generating comprises selectively controlling the amount of background light passing through any given pixel of the silhouette display.

* * * * *